C. DROLET, Sr.
SANITARY AND SAFETY MILK BOTTLE CONTAINER.
APPLICATION FILED JULY 16, 1921.

1,438,907.

Patented Dec. 12, 1922.

Inventor—
Charles Drolet, Sr.
by his Attorneys
Howson & Howson

Patented Dec. 12, 1922.

1,438,907

UNITED STATES PATENT OFFICE.

CHARLES DROLET, SR., OF PHILADELPHIA, PENNSYLVANIA.

SANITARY AND SAFETY MILK-BOTTLE CONTAINER.

Application filed July 16, 1921. Serial No. 485,249.

*To all whom it may concern:*

Be it known that I, CHARLES DROLET, Sr., a citizen of the United States, residing in Philadelphia, Pennsylvania, have invented a Sanitary and Safety Milk-Bottle Container, of which the following is a specification.

The object of this invention is to provide a container for milk bottles into which the milk bottle may be inserted by the milk man with ease and despatch, and which after insertion of said bottle presents considerable difficulty in the way of removal, except by the insertion of another bottle, which automatically releases the bottle occupying the container.

The invention further contemplates the provision of a substantially closed container preventing access to the bottle of animals or children.

The invention will be readily understood from the attached drawings, in which.

Figure 1:
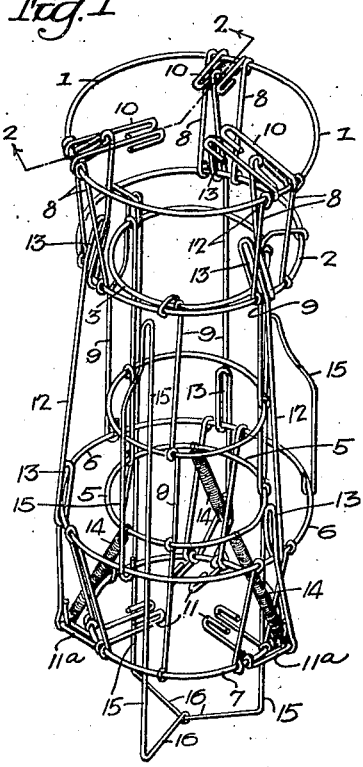
Figure 1, is a view in perspective of the essential working elements of the device.

With reference to the drawings, my device comprises a framework formed in the present instance of stiff wire and comprising a series of horizontally disposed rings 1, 2, 3, 4, 5, 6 and 7, arranged in parallel planes and joined together by suitable connecting elements or braces 8 and 9, said braces 8 uniting the two upper rings 1 and 2, and the remaining rings being joined together and to the said ring 2 by means of the said elements 9. It will be noted that the rings 3, 4, 5 and 7, are of reduced diameter, the purpose of which will be described hereinafter.

Pivotally secured to the said ring 1 and normally extending radially inwardly therefrom is a set, in the present instance three in number, of arms 10, while a similar set of arms 11 is pivotally mounted on the base ring 7, said arms 10 being connected with the arms 11 in pairs by means of connecting rods 12, said connecting rods being connected to the arms 10 at a point intermediate their ends and the point where they are pivoted to the said ring 1, and being connected with the arms 11 through the medium of an outward extension of said arms 11ª, to the outer end of which the lower end of the said rods
12 is pivotally attached.

Figure 2:
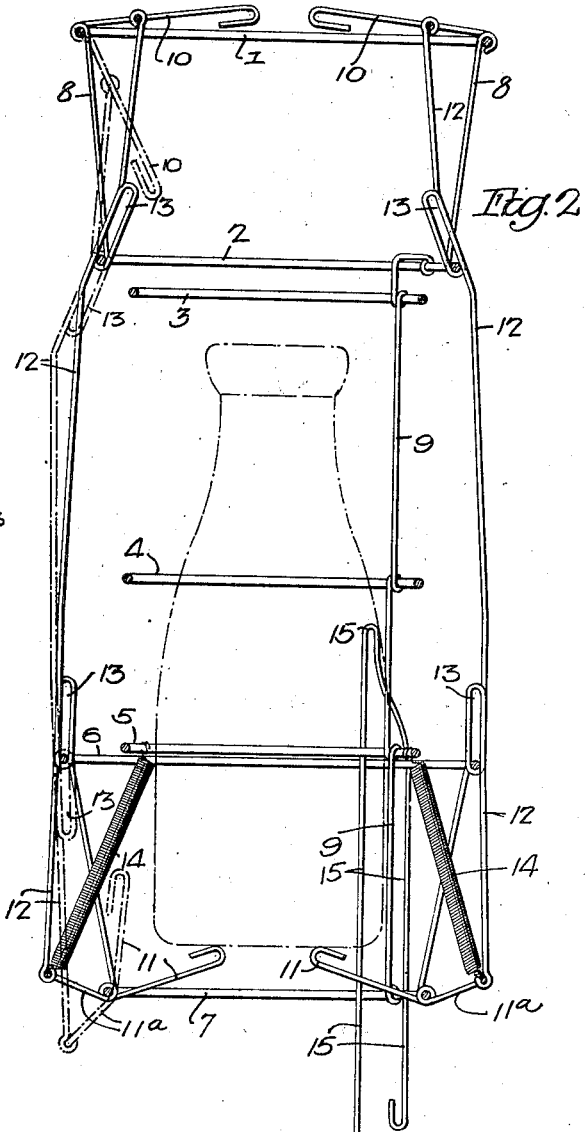
Fig. 2, is a vertical section on the line 2—2, Fig. 1.
Figure 3:
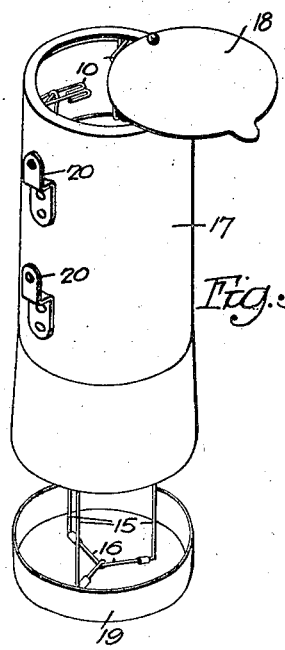
Fig. 3, is a perspective of the device assembled in the casing.

As clearly shown in Fig. 2, the said arms 12 have elongated loops 13 through which extend the rings 2 and 6, said loops while providing retaining and bracing means for the said rods being so disposed as in no way to prevent movement of the rods longitudinally of the frame. It will be apparent that such longitudinal movement of the said rods 12 must result in movement in opposite directions of the arms 10 and 11. The normal position of the arms 10 and 11 is shown in the figures, said arms being normally retained in such normal position by means of springs 14, one end of which is secured to the ring 5, and the opposite end to the outer end of the arms 11ª, the upward movement of the rods 12 under the action of the said springs 14 being limited by the rings 2 and 6 which engage the lower end of the loops 13.

The operation of the device in so far as described is as follows: We will suppose that a bottle, as shown in Fig. 2 in broken lines, occupies the said frame, the bottle being established in a nest formed by the rings 4 and 5, and resting upon the arms 11. It is now desired to move this bottle and insert a new one, and this is accomplished by forcing the said new bottle downwardly against the arms 10 and into the interior of the frame, this downward movement of the new bottle against the arms 10 resulting in the simultaneous depression of said arms 10 to the positions shown in Fig. 2 in broken lines, and the corresponding elevation of the arms 11 also to the positions shown in broken lines, by which movement the said arms 11 are carried clear of the under side of the bottle which occupies the frame which latter is permitted to fall of its own weight from the now open bottom of the frame. At the same time, the new bottle enters the frame, but as soon as it has entered sufficiently to bring the neck of the bottle opposite the ends of the arms 10, these latter arms are permitted to return part way to their normal elevated position, which movement of the arms 10 permits a corresponding drop in the arms 11 sufficient to bring the said latter arms into a position underlying the bottle, which is accordingly supported on the said latter arms and prevented from falling through the bottom of the frame.

In order to prevent the possible breaking of the bottles when released through the bottom of the frame, I provide a sub-frame which acts to catch the bottle and from which the bottle may be removed by hand without trouble, this sub-frame consisting of three arms or rods 15 which extend upwardly on the interior of the rings 6 and 11 but exteriorly of the rings 4 and 5, said rods 15 having their upper ends turned over and downwardly and lying outwardly of the said ring 6 so that the arms when in their lowermost positions are supported upon said ring 6 by means of the turned-over top end. The said rods 15 have at their bottom inwardly extending and connecting arms 16 which provide a support for the bottle after it has left the main frame. Normally this sub-frame is elevated so that the said lateral elements 16 lie directly beneath the arms 11, and when the lateral arms are elevated to release a bottle from the container, the bottle first strikes the said elements 16 and carries the entire sub-frame downwardly to the full extent of its travel by the weight of the bottle, the shock of the fall being substantially reduced, and in this manner eliminating all possible damage to the bottle.

To prevent animals from getting at the bottle and to furnish protection from other possible sources of damage, I surround the said frame with a casing 17, which casing may be secured in a suitable manner to the said frame and completely surrounding the frame, said casing 17 having at the top preferably a suitable cover or lid 18, which may be easily moved away from the top for the insertion of a bottle. In the present instance, I show the casing 17 slightly flared at the bottom to provide room for movement of the lower ends of the rods 12 and the arms 11ª, and I provide at the bottom of the sub-frame and secured to the elements 16 a cup-shaped frame element 19, which, when the said sub-frame is moved to its upper normal position, passes inside the flared outer edge of the casing 17. In this manner a substantially closed casing is provided, affording a bottle full protection.

The casing 19 may be provided, if desired, with suitable hooks or the like 20, by means of which the device may be suspended from suitable supporting elements.

I claim:

1. In a container of the type specified, the combination with an open ended frame, of elements adapted to close the said open ends, means whereby movement of the element at one end to open that end of the frame effects a corresponding opening movement of the element at the other end of the frame, and resilient means tending to retain the elements in positions closing the frame.

2. In a container of the type specified, the combination of a movable element extending across the bottom of said frame and constituting a support for a continued bottle, with an element extending across the top of said frame and normally disposed in the path of a bottle inserted into the frame through the top thereof, and interconnecting elements whereby the inward movement of said top elements effects corresponding inward movement of the said bottom elements to release the said contained bottle.

3. In a container of the type specified, the combination of a frame, elements pivotally secured to said frame and extending across the bottom thereof and constituting a support for a milk bottle contained by said frame, of pivotally mounted elements secured to said frame at the top thereof and extending inwardly across the top end of said frame, interconnecting means between the said top pivoted elements and the lower pivoted elements such that inward movement of one entails the inward movement of the other, and resilient means normally retaining said elements in a frame-closing position.

4. In a container of the type specified, the combination with an open-ended frame, of elements pivoted to said frame and extending inwardly across one end of said frame, elements pivoted at the other end of said frame and extending across the said open end, said elements respectively closing the ends of the frame, means connecting said end elements whereby inward movement of the elements at one end entails corresponding inward movement of the elements at the other end, and resilient means normally retaining said elements in the frame-closing positions.

5. In a container of the type specified, the combination of an open-ended frame, elements normally closing the said open ends, said closing elements being interconnected so that the movement of the elements at one end to open that end of the frame effects a corresponding opening movement of the elements at the other ends of the frame, and a sub-frame movable relative to the main frame and constituting an extension of the frame at one end, substantially as and for the purpose set forth.

6. In a container of the type specified, the combination of a substantially tubular casing having a removable closure at each end, and elements disposed within said end closures and adapted normally to lie across the said ends of the casing to obstruct the insertion of an article into said casing or the removal of an article therefrom, and means interconnecting said elements such that movement of the elements at one end of the casing to permit the insertion of an article therein entails the corresponding movement of the elements at the other end of the casing to permit the withdrawal of an article therefrom.

CHARLES DROLET, Sr.